(12) United States Patent
Huang et al.

(10) Patent No.: US 12,433,972 B2
(45) Date of Patent: Oct. 7, 2025

(54) HYDROGEL FOR CELL-LADEN BIOPRINTING, BIOINK, AND PREPARATION METHOD AND APPLICATION THEREOF

(71) Applicants: SHANDONG UNIVERSITY, Shandong (CN); YANSHAN UNIVERSITY, Hebei (CN)

(72) Inventors: Chuanzhen Huang, Qinhuangdao (CN); Zhuang Chen, Jinan (CN); Hanlian Liu, Jinan (CN); Zhenyu Shi, Jinan (CN); Peng Yao, Jinan (CN); Dun Liu, Jinan (CN); Hongtao Zhu, Jinan (CN); Bin Zou, Jinan (CN); Zhen Wang, Shandong (CN); Minting Wang, Qinhuangdao (CN); Longhua Xu, Qinhuangdao (CN); Shuiquan Huang, Qinhuangdao (CN); Meina Qu, Qinhuangdao (CN); Zhengkai Xu, Qinhuangdao (CN); Yabin Guan, Qinhuangdao (CN)

(73) Assignees: SHANDONG UNIVERSITY, Jinan (CN); YANSHAN UNIVERSITY, Qinhuangdao (CN)

( * ) Notice: Subject to any disclaimer, the term of this patent is extended or adjusted under 35 U.S.C. 154(b) by 530 days.

(21) Appl. No.: 18/081,964

(22) Filed: Dec. 15, 2022

(65) Prior Publication Data
US 2024/0108784 A1    Apr. 4, 2024

(30) Foreign Application Priority Data
Sep. 29, 2022  (CN) .......................... 202211199865.6

(51) Int. Cl.
| | |
|---|---|
| *A61L 26/00* | (2006.01) |
| *B29C 64/118* | (2017.01) |
| *B33Y 10/00* | (2015.01) |
| *B33Y 70/00* | (2020.01) |
| *B33Y 80/00* | (2015.01) |
| *B29K 77/00* | (2006.01) |
| *B29L 31/00* | (2006.01) |

(52) U.S. Cl.
CPC ......... *A61L 26/008* (2013.01); *A61L 26/0052* (2013.01); *B29C 64/118* (2017.08); *B33Y 10/00* (2014.12); *B33Y 70/00* (2014.12); *B33Y 80/00* (2014.12); *B29K 2005/00* (2013.01); *B29K 2077/00* (2013.01); *B29L 2031/753* (2013.01)

(58) Field of Classification Search
CPC ............................. A61L 26/008; B33Y 10/00
See application file for complete search history.

*Primary Examiner* — Amber D Steele
(74) *Attorney, Agent, or Firm* — Oliff PLC

(57) ABSTRACT

A hydrogel for cell-laden bioprinting, bioink, and a preparation method and an application thereof, relates to the technical field of biomedical polymer hydrogels. The hydrogel for cell-laden bioprinting is polymer gel formed by adding a cell-specific material into a matrix of alginate and gelatin and crosslinking and curing, wherein the cell-specific material is polypeptide selected according to different laden cells. The structures printed using the hydrogel may have the advantages such as adjustable mechanical properties, adjustable porosity, high biocompatibility, high printing accuracy, and high customizability, which may widely support the printing of human tissues and organs such as spinal cord, cartilage, and heart, and has good prospects for applications in tissue repair, organ transplantation and so on.

19 Claims, 7 Drawing Sheets

HYDROGEL FOR CELL-LADEN BIOPRINTING, BIOINK, AND PREPARATION METHOD AND APPLICATION THEREOF

CROSS-REFERENCES TO RELATED APPLICATIONS

This application claims priority benefits to Chinese Patent Application No. 202211199865.6, filed 29 Sep. 2022, the contents of which are incorporated herein by reference.

TECHNICAL FIELD

The present invention relates to the technical field of biomedical polymer hydrogels, and in particular to hydrogel for cell-laden bioprinting, bioink, and a preparation method and an application thereof.

BACKGROUND

Information of the related art part is merely disclosed to increase the understanding of the overall background of the present invention, but is not necessarily regarded as acknowledging or suggesting, in any form, that the information constitutes the prior art known to a person of ordinary skill in the art.

In the prior arts, the treatment solutions for large-area skin trauma and organ tissue injury generally rely on the patient's own repair capacity and organ transplantation. However, for the large-area skin trauma and organ injury that exceeds the repair capacity of the human body, an autologous transplantation or an allogeneic transplantation is usually adopted. However, the autologous transplantation will cause greater secondary damage to the patient, and the allogeneic transplantation is difficult to match a suitable donor. Therefore, an effective treatment of the large-area skin trauma and organ tissue injury has been a major problem in the medical field.

With the progress of science and technology, a 3D bioprinting technology provides a new clinical medical strategy for tissue and organ repair, and has been applied in the medical field, such as tissue and organ substitute construction, organ transplantation and regeneration, drug screening models and anatomical models. The 3D bioprinting has many advantages for tissue and organ repair, allowing complex tissue structure printing, cell-laden printing, controllable precise deposition for different cell numbers and cell densities, and easy access to the gradient of physicochemical property biomaterials. Bioink capable of loading living cells is particularly important for the 3D bioprinting, and proper physical and chemical properties of hydrogel materials are the premise for cell adhesion, migration, and proliferation. Therefore, the hydrogel material needs to have good biocompatibility, which can provide both a specific microenvironment for cell growth and a basis for the induction of cell functionalized behavior; at the same time, it must also have good printability, a degradation rate that matches the regeneration rate of tissue cells, a swelling rate suitable for cell growth, and good mechanical properties, etc.

In a three-dimensional culture of cells, in order to ensure printability, biological scaffold materials need to have a high elastic modulus. During in vitro culture, the mechanical properties of biological scaffolds affect the activity, proliferation and differentiation of cells, and different cells have different requirements for the mechanical properties of the biological scaffolds. Therefore, in order to ensure the good biocompatibility of the biological scaffolds, it is necessary to make the mechanical properties of biological scaffold as close as possible to the mechanical properties required by cultured cells in vivo environment. In order to support cell proliferation and migration as well as nutrient transport, a certain porosity of the biological scaffold is required. At present, the preparation of hydrogel materials with good comprehensive properties is still the difficulty of 3D bioprinting.

SUMMARY

For overcoming the problems in the prior art, it is an object of the present invention to provide hydrogel for cell-laden bioprinting, capable of advantages such as adjustable mechanical properties, adjustable porosity, high biocompatibility, high printing accuracy, and high customizability, which can widely support the printing of human tissues such as spinal cord, cartilage, and heart. According to the present invention, by adding different cell-specific materials to a matrix material, bioactive tissues can be printed directly, which has good prospects for application in tissue repair, organ transplantation and so on.

To achieve the above-mentioned objectives, the present invention provides the following technical solutions.

The first objective of the present invention is to provide hydrogel for cell-laden bioprinting, being polymer gel formed by adding a cell-specific material into a matrix of alginate and gelatin and crosslinking and curing, wherein the cell-specific material is polypeptide.

The second objective of the present invention is to provide a method for preparing cell-laden bioink, comprising the steps of: a preparation for cell-laden bioink precursor: adding sodium alginate to phosphate buffered saline (PBS) and dissolving by stirring with warming to obtain alginate solution, adding and dissolving gelatin and cell-specific materials to the PBS to obtain gelatin composite solution; mixing the alginate solution and the gelatin composite solution evenly to obtain bioink solution; centrifuging cell suspension, and then adding the bioink solution and blowing the cells being dispersed and even to obtain the cell-laden bioink precursor.

In one preferred embodiment of the present invention, a concentration range of the alginate is 2-5% w/v and a concentration range of the gelatin is 2-8% w/v.

In another preferred embodiment of the present invention, for L929 cells, the cell-specific material is polypeptide CMP27, the concentration of the alginate is 2.5% w/v and the concentration of the gelatin is 6% w/v.

The third objective of the present invention is to provide a method for preparing a cell-laden scaffold, comprising the steps of: loading the cell-laden bioink prepared by the above-described preparation method into a printer syringe, extruding the cell-laden bioink onto a cryogenic platform through a pneumatic nozzle on the 3D printer to prepare a grid-like cell-laden scaffold, then soaking the printed cell-laden scaffold in 4.5% w/v calcium chloride solution for 5 min, and then obtaining a final structure of the cell-laden scaffold after being washed with PBS (phosphate buffered saline).

The fourth objective of the present invention is to provide a cell-laden scaffold prepared by using a method for preparing the cell-laden scaffold as described above.

The fifth objective of the present invention is to provide a Band-aid, comprising the cell-laden scaffold as described above.

The sixth objective of the present invention is to provide a method of preparing tissues and organs using a freeform reversible embedding of suspended hydrogels (FRESH) extrusion printing, comprising the steps of: fixing a gelatin support bath on a cryogenic platform, loading cell-laden bioink prepared using the method for preparing the cell-laden bioink as described above into a syringe of a 3D bioprinter, extruding and printing the bioink into the support bath through a pneumatic nozzle, raising the temperature of the cryogenic platform after the printing is completed, releasing a structure being printed and washing the structure with the PBS.

In another preferred embodiment of the present invention, comprising: incubating prepared solution containing 5% (w/v) gelatin and 1% (w/v) $CaCl_2$ at 4° C. for 24 h, then crushing the incubated solution using a crusher after adding $CaCl_2$ solution with 3 times the volume; centrifuging gelatin granules obtained from the crushing, then removing supernatant, then centrifuging the gelatin granules again to obtain gelatin slurry after being washed three times with 1% (w/v) $CaCl_2$ solution, and then transferring the gelatin slurry to a petri dish.

The seventh objective of the present invention is to provide an application of hydrogel for cell-laden bioprinting as described above or a cell-laden scaffold as described above in the biomedical field.

One or More Technical Solutions Provided in the Present Invention at Least have the Following Technical Effects or Advantages:

1. According to the present invention, the bioink for cell-laden 3D bioprinting can independently regulate the mechanical properties and biological properties of the printed structure. By adjusting the composition ratio of the matrix materials, the quantitative adjustment of the porosity and mechanical properties of the hydrogel can be achieved simultaneously. By adding different components of additive materials, the biocompatibility requirements of different cells can be met to induce the migration and differentiation of cells.

2. According to the present invention, designing two ways of cryogenic printing and FRESH printing by combining the bioink to construct the printing structure, which can simultaneously meet the requirements of rapid printing of simple cell scaffolds and high-precision printing of complex tissues and organs, and the whole process uses natural biological materials, which will not harm cells.

3. According to the present invention, optimizing the cryogenic printing process for the bioink, making the survival rate of the printed cells up to 96%; and the printing process is simple and rapid, which can be completed within 5 min, realizing an application of the rapid custom printing of cell-laden dressings; optimizing the FRESH printing process, making the temperature of the whole printing process is kept within the suitable range for cells, which can meet the printing application of a long time and large scale complex tissues and organs.

The advantages of additional aspects of the present invention will be given in the following description, and partially will become apparent from the following description, or will be learned from the practice of the present invention.

In order to make the above objectives, features, and advantages of the present invention more obvious and understandable, the following is a detailed description of the preferred embodiments in combination with the attached drawings.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1A:
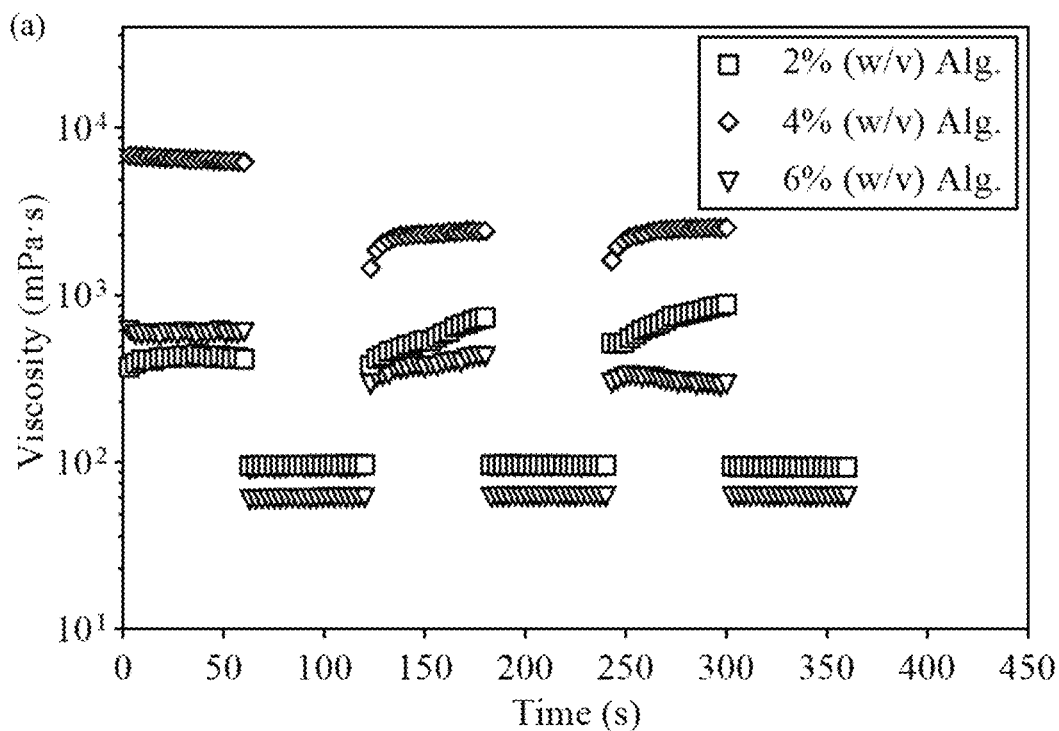
FIG. 1(a) shows a shear recovery characteristic in a rheological test result of bioink in Example 1 of the present invention.

The spacing or size between each other is exaggerated to show the position of each part, and the schematic diagram is only used for illustration.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

The present invention proposed multifunctional hydrogel bioink with adjustable mechanical properties for cell-laden 3D bioprinting, comprising polymer gel formed by using alginate, gelatin, and cell-specific additive materials as monomers and cross-linking and curing. Wherein, the cell-specific materials are polypeptides, and different polypeptides are selected according to different laden cells. For examples, for L929 fibroblasts, osteoblasts, and neural stem cells, the cell adhesion polypeptides can be added, including, and not limited to RGD polypeptides, CMP27 and other collagen-mimetic polypeptides; for skin tissue cells, antimicrobial peptides can be added, including and not limited to ε-poly-L-lysine, PMAP-class polypeptides, and Protegrin-class polypeptides, etc. The hydrogel can be molded by both temperature-sensitive cross-linking and ionic cross-linking. The elastic modulus of the scaffold can be adjusted by adjusting the concentration of alginate, and the porosity during long-term incubation can be adjusted by adjusting the concentration of gelatin. Specifically:

The alginate, isolated from brown algae, has high biocompatibility. The guluronic acid on the alginate molecule can bind to calcium ions thus forming a three-dimensional network molecule in the form of ionic cross-linking to form a hydrogel network, which can be stable in the medium for a long time. By changing the concentration of alginate in the gel, the mechanical behavior of the gel can be changed.

The gelatin, containing many bioactive sites, has both good biodegradability and modulation of cell adhesion, and gelatin solutions have good temperature sensitivity and can form a hydrogel network by physical cross-linking.

According to the present invention, a method for preparing cell-laden bioink comprises the steps of:

Step 1: dissolving 2-5% (w/v) alginate in 1×PBS and stirring for 2 h at 37-40° C., then carrying out a degassing treatment using an ultrasonic dispersing apparatus to obtain alginate solution, and sterilizing the solution using UV irradiation;

Step 2: dissolving gelatin particles in 1×PBS and adding cell-specific materials, and then stirring for 1 h at 37° C., carrying out the degassing treatment using the ultrasonic dispersion apparatus to obtain gelatin composite solution, and sterilizing the solution using 0.22 μm filter; Step 3: evenly mixing the alginate solution with gelatin composite solution at 40° C. in a 1:1 ratio to obtain cell-laden bioink precursor solution; and Step 4: uniformly dispersing cultured cells in the cell-laden bioink precursor solution at a density of $1 \times 10^6$ $ml^{-1}$ to obtain the cell-laden bioink.

Using the cell-laden bioink for 3D bioprinting obtained using the preparation method as described above to construct a cell-laden scaffold with adjustable mechanical properties and porosity.

According to the mechanical properties of the specific tissue, the mechanical behavior of the printed tissue may be regulated by adjusting the concentration of alginate matrix in the bioink. According to the rate of cell proliferation and migration, the porosity of the tissue scaffold in long-term culture may be regulated by adjusting the concentration of gelatin in the bioink.

The present invention provides a method for rapid preparation of cell-laden scaffolds by cryogenic extrusion printing, comprising:

storing cell-laden bioink of the present invention in a cryogenic printer syringe, and setting a temperature of the syringe at 26° C. and a temperature of a printer platform at 5° C.; constructing a grid-like cell-laden scaffold by printing layer by layer, and soaking and incubating the scaffold with 4.5% (w/v) $CaCl_2$ solution for 5 min after the print is completed, then transferring the scaffold to complete medium for culture after being washed twice with 1×PBS.

The present invention further provides a cell-laden hydrogel trauma dressing, i.e., a Band-aid prepared using a cell-laden scaffold described above.

The present invention further provides a method for high-precision printing of vitro tissues, comprising:

constructing high-precision tissue and organ (accuracy of 200 μm) using cell-laden bioink of the present invention through FRESH printing, for applications such as in vitro tissue organ drug experiments, organ transplantation. Specifically:

Step 1: incubating prepared solution containing 5% (w/v) gelatin, 1% (w/v) $CaCl_2$ at 4° C. for 24 h, then crushing the incubated solution using a crusher after adding $CaCl_2$ solution with three times the volume; centrifuging (×2000 g, 10 min) gelatin granules obtained after crushing and removing supernatant, then centrifuging (×2000 g, 10 min) the gelatin granules again after three times washing with 1% (w/v) $CaCl_2$ solution to obtain gelatin slurry, and then transferring the gelatin slurry to a petri dish;

Step 2: slicing a 3D structure to be printed using Slic3r (a toolpath generator for 3D printers), sending a generated G-code to a bioprinter;

Step 3: fixing the petri dish with the gelatin slurry on a cryogenic platform of the bio-printer, and setting a temperature of the platform to 15° C.; storing cell-laden bioink of the present invention in a syringe of the cryogenic printer, and setting a temperature of the syringe to 26° C., and then printing a designed structure into a support bath (of the gelatin slurry); and Step 4: after printing is complete, raising the temperature of the platform to 37° C., and then releasing the printed structure from the support bath; transferring the structure to culture solution for culture after washing twice with 1×PBS.

Accordingly, the structure may be printed and shaped by both a cryogenic extrusion printing and a FRESH extrusion printing. Wherein, the cryogenic extrusion printing can quickly construct simple cell-laden three-dimensional structures that can be directly used for applications such as trauma repair; the FRESH extrusion printing can construct complex structures with high precision that can be used to construct tissues and organs. The printed structures have the advantages of adjustable mechanical properties, adjustable porosity, high biocompatibility, high printing accuracy, and high customizability, etc., which have good prospects for application in tissue repair, organ transplantation and so on.

Example 1

A Method for Preparing Cell-Laden Bioink

1. Preparation of Alginate Solution:

weighing and dissolving 0.5 g of sodium alginate powder in 10 ml of 1×PBS (phosphate buffered salt solution), stirring the solution at 920 r/min for 2 h using a magnetic stirrer, while heating the solution to 40° C. and keeping it until the alginate is completely dissolved to obtain 5% (w/v) alginate solution; then, degassing the alginate solution using an ultrasonic cleaner for 2 min and then transferring the degassed alginate solution to a clear glass vial and sterilizing it using 260 nm UV light for 24 h; after sterilization, transferring the alginate solution to 4° C. for storage.

2. Preparation of Gelatin/Polypeptide CMP27 Composite Solution:

weighing and dissolving 1.2 g of gelatin powder and 4 mg of polypeptide CMP27 (a specific additive material for L929 cells, which is existing biomaterial-collagen mimetic polypeptide, and its role is to promote L929 cell adhesion, reference: collagen mimetic peptide and its effect on fibroblast adhesion) in 10 ml of 1×PBS, stirring the solution at 700 r/min for 1 h using the magnetic stirrer, while heating the solution to 37° C. and keeping it until the dissolvent is completely dissolved to obtain gelatin/polypeptide composite solution; after stirring, degassing the composite solution using an ultrasonic cleaner for 2 min and then sterilizing it by filtering with 0.22 um filter.

3. Preparation of Cell-Laden Bioink Precursor:

heating the prepared alginate solution and gelatin/polypeptide CMP27 composite solution to 40° C. and mixing them in a ratio of 1:1, mixing the mixture evenly using a vortex oscillator to obtain bioink precursor, which is then kept at 40° C. for use.

4. Cell Culture and Preparation of the Cell-Laden Bioink:

selecting L929 mouse fibroblasts and culturing them in medium containing 10% fetal bovine serum and 1% penicillin/streptomycin; keeping the cultures in a humidified incubator with 37° C. and 5% $CO_2$, and changing the medium every other day; before preparing the bioink, digesting the cells, with a count cell density of $3 \times 10^6$ ml$^{-1}$; aspirating 2 ml of cell suspension according to the cell density of $1 \times 10^6$ ml 1 in bioink and centrifuging it; aspirating 6 ml of the bioink precursor solution and blowing the cells evenly to obtain L929-specific cell-laden bioink.

Example 2

A Construction of Cell-Laden 3D Grid Scaffolds by Cryogenic Extrusion Printing

1. Preparation of Bioink:
Same as Steps 1, 2 and 3 in Example 1.
2. Preparation of L929 Cell-Laden Bioink:
Same as Step 4 in Example 1.
3. Printing of the Cell-Laden 3D Grid Scaffold:

transferring cell-laden bioink into a syringe of a 3D bio-printer, setting a temperature of the syringe to 26° C., and incubating the bioink for 10 min before printing; selecting the printing mode to print one by one, and conducting the printing in a petri dish with 41035 mm; setting a temperature of the printing platform at 5° C., a needle size to 22 G, a layer height to 0.3 mm, a printing speed to 100 mm/min, a movement speed to 900 mm/min, a return axis speed to 2000 mm/min, a brim width (edge width) to 1 mm, and a brim speed (edge printing speed) to 100 mm/min; setting a printing pressure to 16 kpa, to print a three-layer grid structure, a printed size to 12.0 mm×12.0 mm, a layer height to 0.3 mm, and a spacing to 1 mm×1 mm.

4. Culture of the Cell-Laden Scaffold:

further cross-linking the scaffolds using 5% (w/v) $CaCl_2$ solution soaked for 5 min after printing, then transferring the scaffolds to culture medium containing 10% (w/v) fetal bovine serum, 1% (w/v) penicillin/streptomycin after washing twice with 1×PBS; placing the cultures in an incubator at 37° C., 5% $CO_2$.

Example 3

Constructing a High-Precision Complex Structure with Low Elastic Modulus by a FRESH Extrusion Bioprinting 1. Preparation of Bioink:
Same as Steps 1, 2 and 3 in Example 1.
2. Preparation of a Support Bath:

measuring out 50 ml of ultrapure water, weighing 2.5 g of gelatin granules and 0.5 g of $CaCl_2$) granules, stirring the solution at 700 r/min for 1 h using a magnetic stirrer, heating the solution to 37° C. while the stirring, degassing the solution using an ultrasonic cleaner for 2 min after the stirring is completed, to obtain 5% (w/v) gelatin solution, then transferring the gelatin solution to a 50 ml centrifuge tube and incubating the gelatin solution at 4° C. for 24 h to wait for the gelatin to crosslink; weighing and dissolving 3 g of $CaCl_2$ granules in 300 ml of ultrapure water to prepare 1% (w/v) $CaCl_2$ solution, then putting the cross-linked gelatin gel into a crusher after being cut into squares of 10 mm 3, and adding the 1% (w/v) $CaCl_2$ solution with 3 times the volume, then crushing them at 10000 r/min for 60 s to obtain the solution of gelatin granules, then centrifuging the solution of gelatin granules under the centrifugal force of 2000 g with a centrifuge, removing supernatant after centrifugation, and then centrifuging and washing the solution of gelatin granules after adding the 1% (w/v) $CaCl_2$ solution with 3 times the volume again to obtain gelatin slurry.

Figure 6:
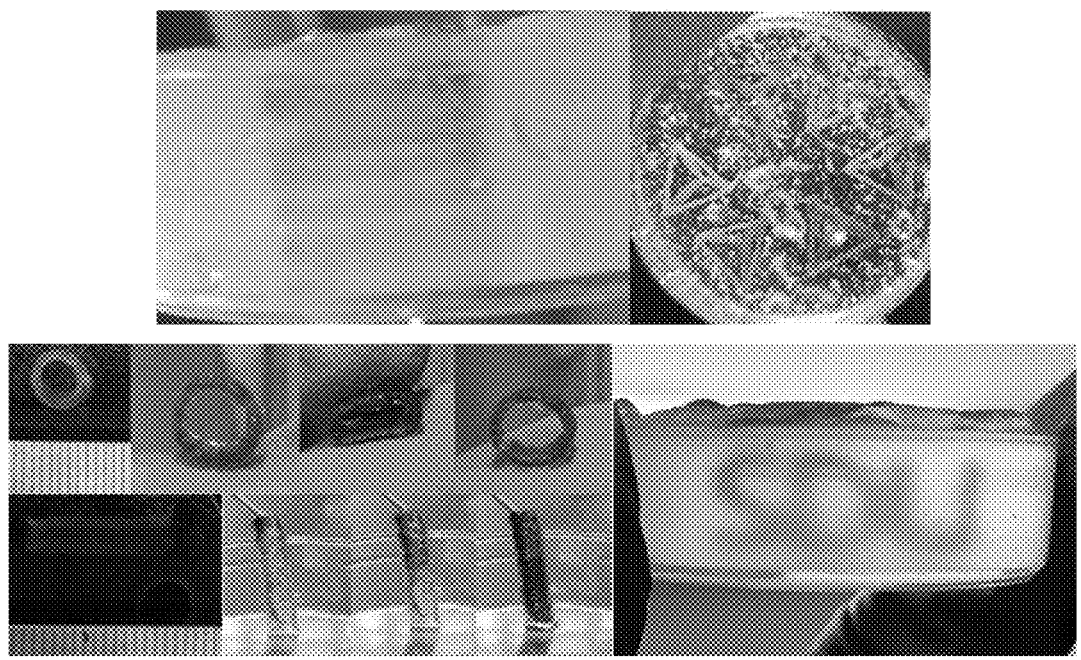
FIG. 6 shows a schematic diagram of the printed structure in Example 3 of the present invention.

3. Setting of the FRESH Bioprinting Process:

slicing a designed 3D model of tissue using the Slic3r (3D slicing software), wherein setting a layer height to 0.2 mm, a fill pattern to Rectilinear (straight line), a fill density to 30%, and sending a G code generated after the slice is completed to the bioprinter;

transferring the prepared gelatin support bath to a petri dish of Φ35 mm and placing the petri dish on a cryogenic platform of the bioprinter, setting a temperature of the cryogenic platform to 15° C.; transferring the cell-laden bioink into a syringe of the bioprinter, setting a temperature of the syringe to 26° C. and carrying out the printing after the bioink being incubated for 10 min, wherein setting a needle size to 25 G, a layer height to 0.2 mm, a printing speed to 100 mm/min, a movement speed to 900 mm/min, a return axis speed to 2000 mm/min, a Brim Width (edge width) to 1 mm, a Brim speed (edge printing speed) to 100 mm/min, and a printing pressure to 30 kpa; performing the printing for a series of complex spatial structures, as shown in FIG. 6.

In the following, the advantages of the hydrogel material in the examples in the application of tissue engineering scaffold or cell-laden printed tissue will be explained through the following tests.

1. Rheological Tests

A rheology evaluation for the cell-laden hydrogel of the present invention was carried out. As shown in FIG. 1(a), for the flow characteristics of the bioink, a viscosity of the bioink was tested at 37° C. at shear rates ranging from 0.01 to 1000 r·s$^{-1}$. It can be seen that the shear viscosity at all concentration ratios decreases with increasing shear rate within the measured shear rate range, indicating that all samples exhibit shear thinning behavior.

Figure 1B:
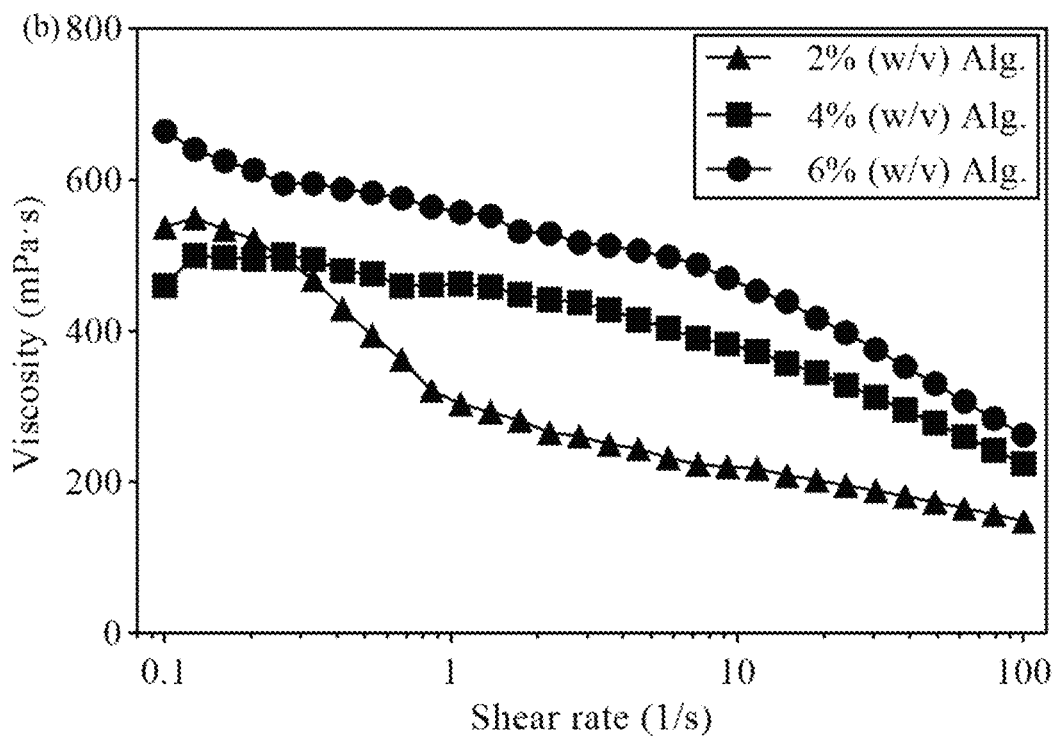
FIG. 1(b) shows a shear thinning characteristic in the rheological test result of bioink in Example 1 of the present invention.

In addition, the thixotropy properties of the bioink were also tested, as shown in FIG. 1(b), at 37° C., the process of the hydrogel extruded from a nozzle was simulated by measuring changes of multiple sets of high and low shear rate. From figures, the viscosities of the bioink under all concentration ratios change dramatically when the shear rate changes abruptly. This characteristic indicates that the bioink passes through the nozzle in a low viscosity state during the printing process, and once extruded from the nozzle, the flow rate of the bioink becomes 0, that is, the bioink immediately returns to a high viscosity state, which is beneficial to the maintenance of the printed structure.

Figure 1C:
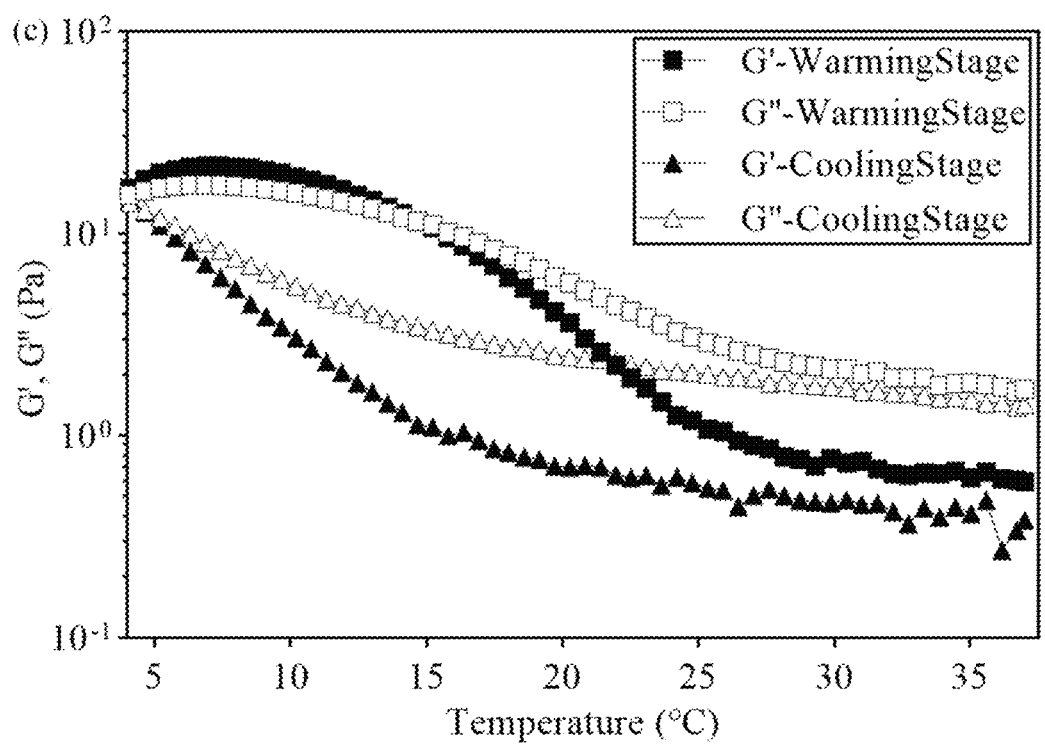
FIG. 1(c) shows a gel kinetic curve for 2% gelatin concentration in the rheological test result of bioink in Example 1 of the present invention.
Figure 1D:
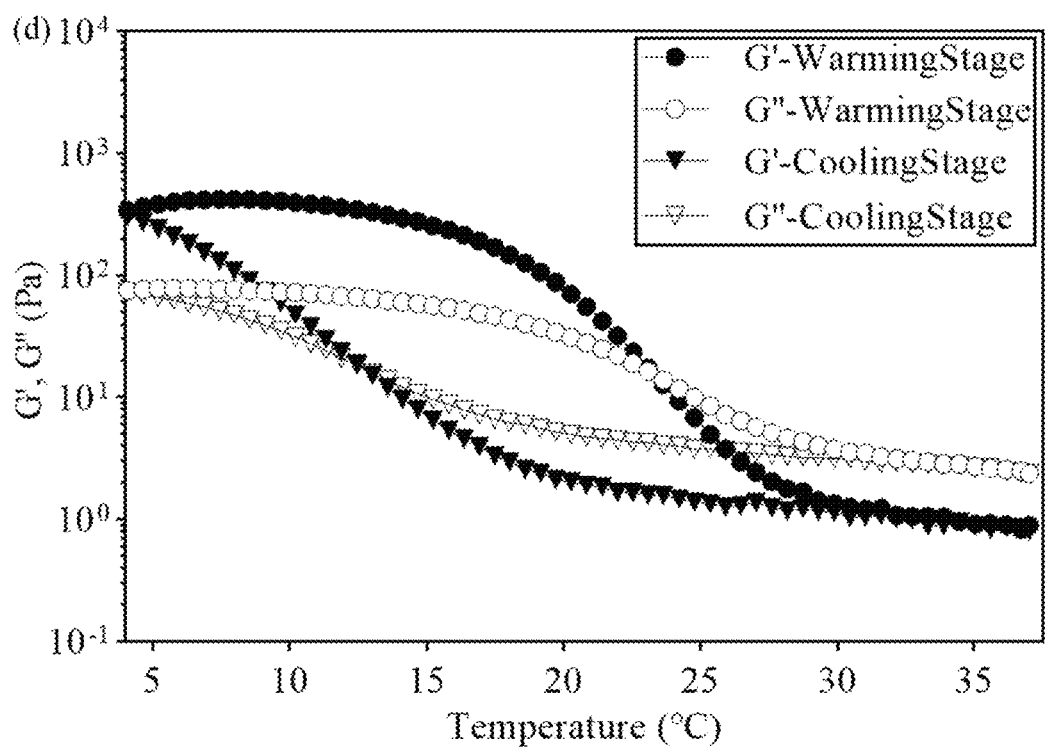
FIG. 1(d) shows the gel kinetic curve for 4% gelatin concentration in the rheological test result of bioink in Example 1 of the present invention.
Figure 1E:
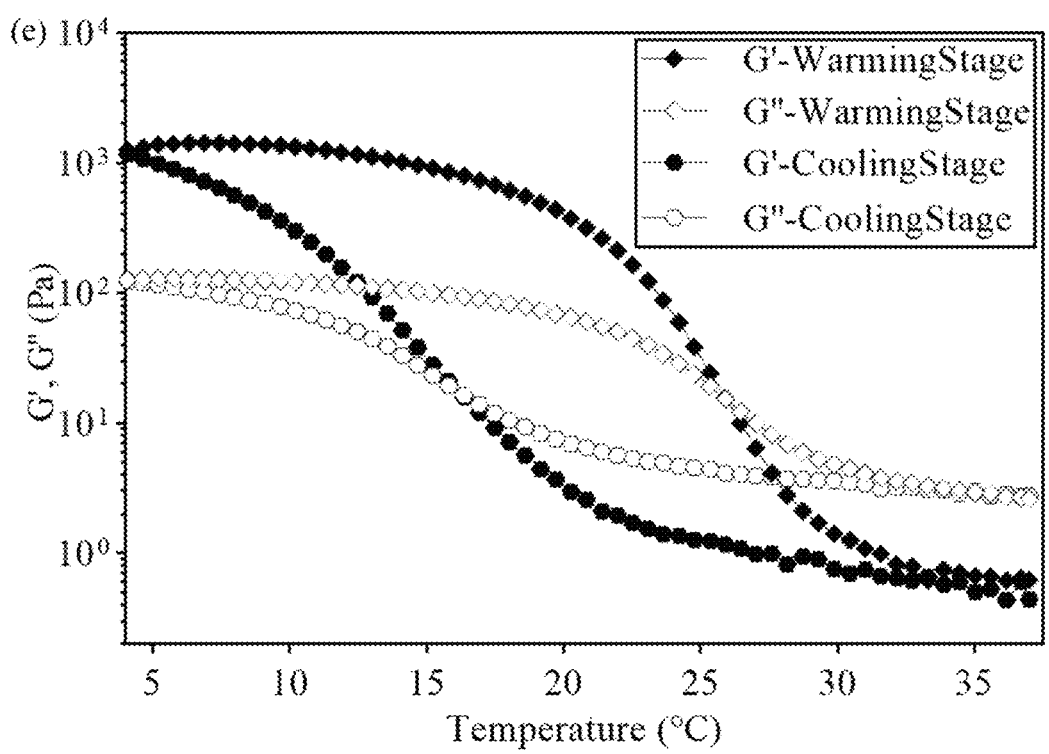
FIG. 1(e) shows the gel kinetic curve for 6% gelatin concentration in the rheological test result of bioink in Example 1 of the present invention.

For the gel kinetics of the cells, a test for the bioink was carried out in a shaking mode at a frequency of 1 Hz and in the range of 4-37° C. As shown in FIG. 1(c), it can be found that a storage modulus G' of the bioink is greater than a loss modulus G" thereof at a lower temperature, at this time, the bioink shows the property of solid; at higher temperatures, the storage modulus G' is less than the loss modulus G", and the bioink shows the property of fluid. Wherein, an intersection of G' and G" represents the temperature at which the sol-gel transition occurs. It can be seen that the rheological behaviors of the bioink in the process of heating up and cooling down are different, and a gel-temperature of the bioink is about 10° C. lower than a sol-temperature thereof, which indicates that the bioink is very suitable for the cryogenic printing and can maintain a cured state at room temperature after printing.

2. Mechanical Properties Test

Figure 2:
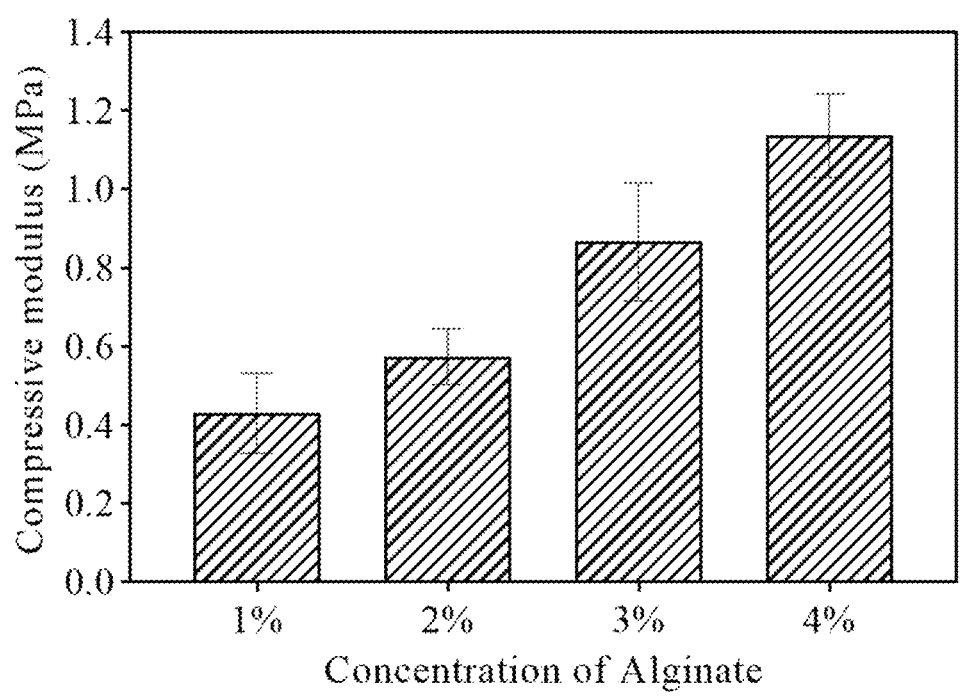
FIG. 2 shows an elastic modulus test result of gel in Example 2 of the present invention.
Figure 3A:
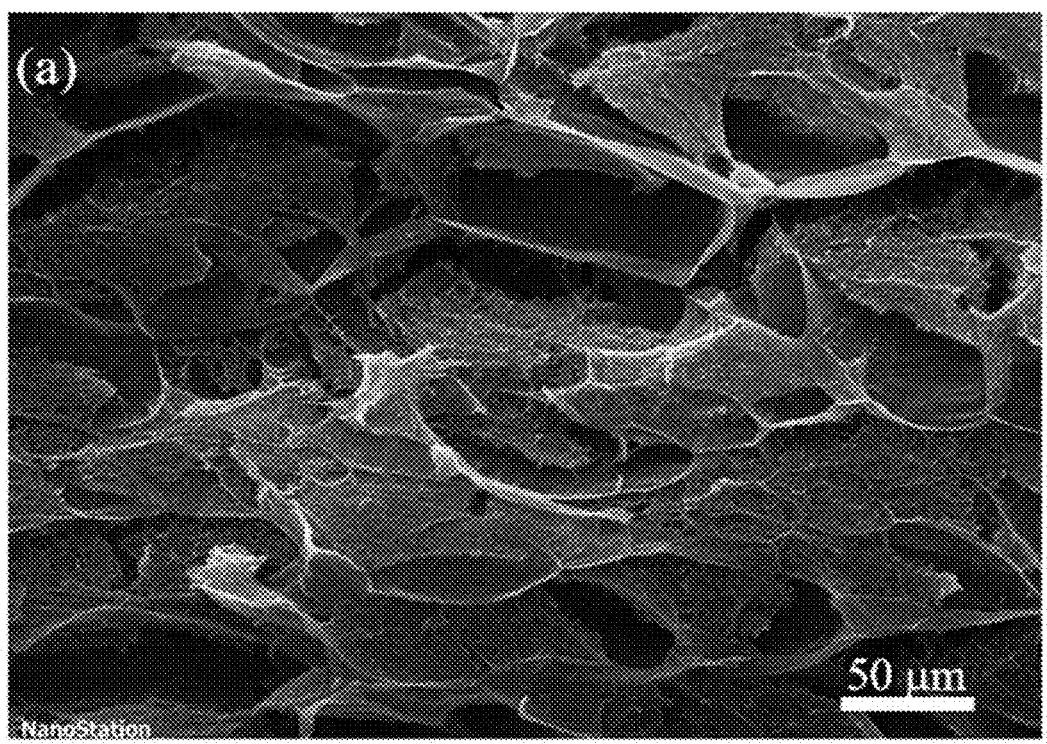
FIG. 3(a) shows a microstructure of the gel under gelatin concentrations of 2% (w/v) in Example 2 of the present invention under a scanning electron microscope (SEM)
Figure 3B:
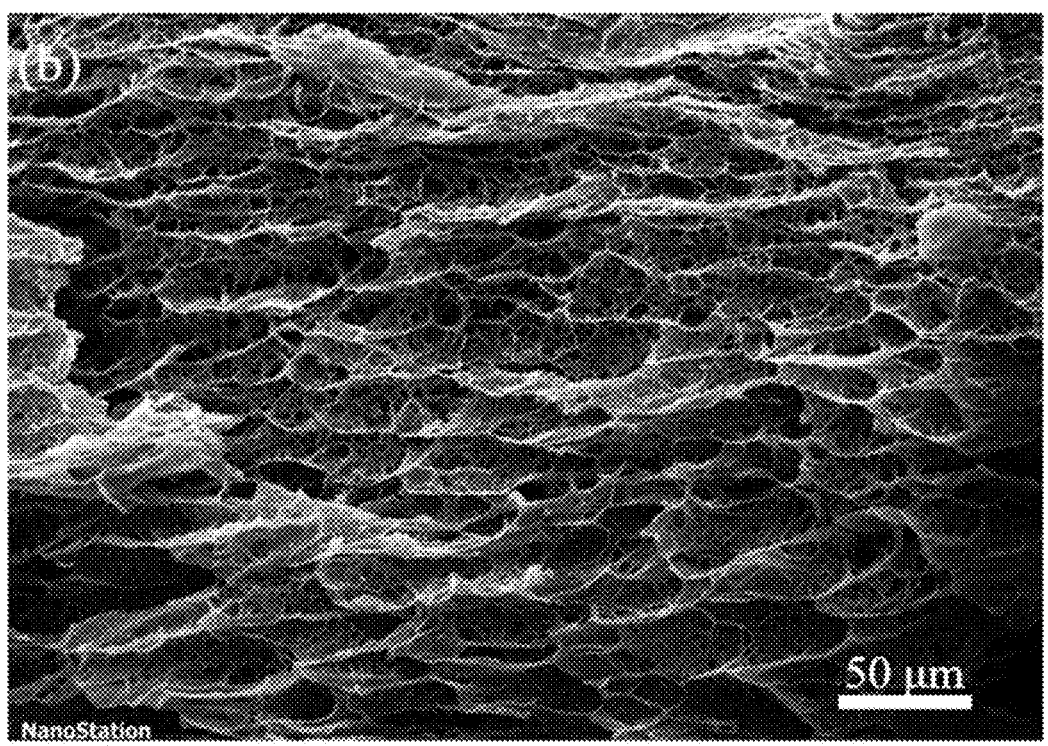
FIG. 3(b) shows the microstructure of the gel under gelatin concentrations of 4% (w/v) in Example 2 of the present invention under the SEM.
Figure 3C:
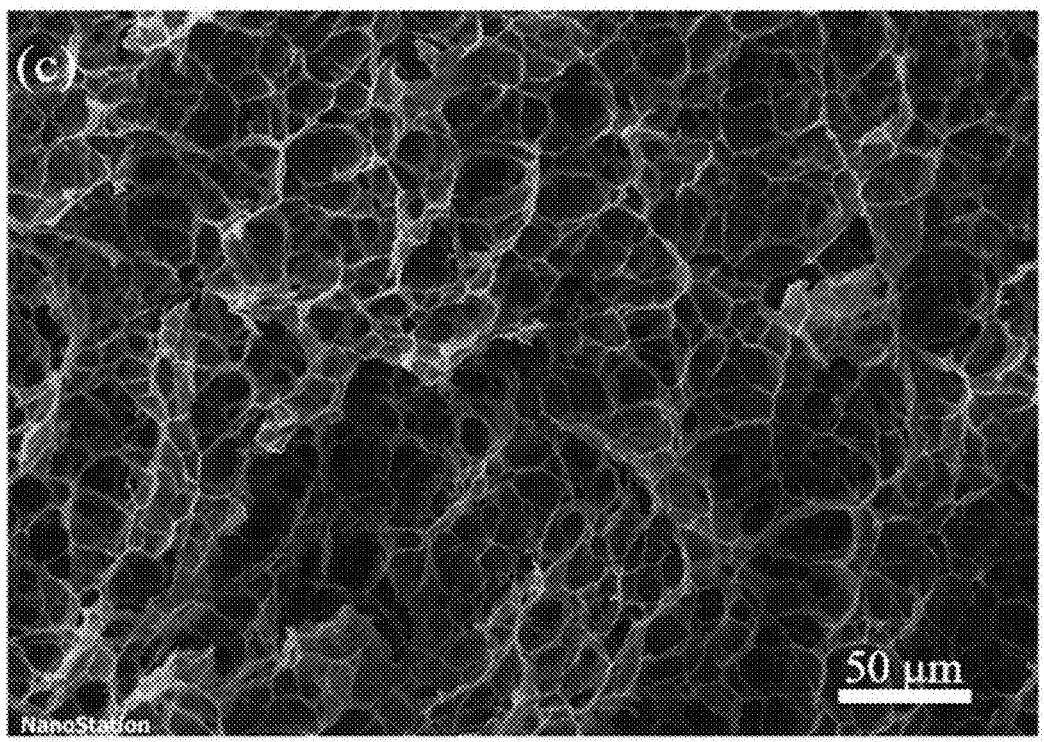
FIG. 3(c) shows the microstructure of the gel under gelatin concentrations of 6% (w/v) in Example 2 of the present invention under the SEM.
Figure 3D:
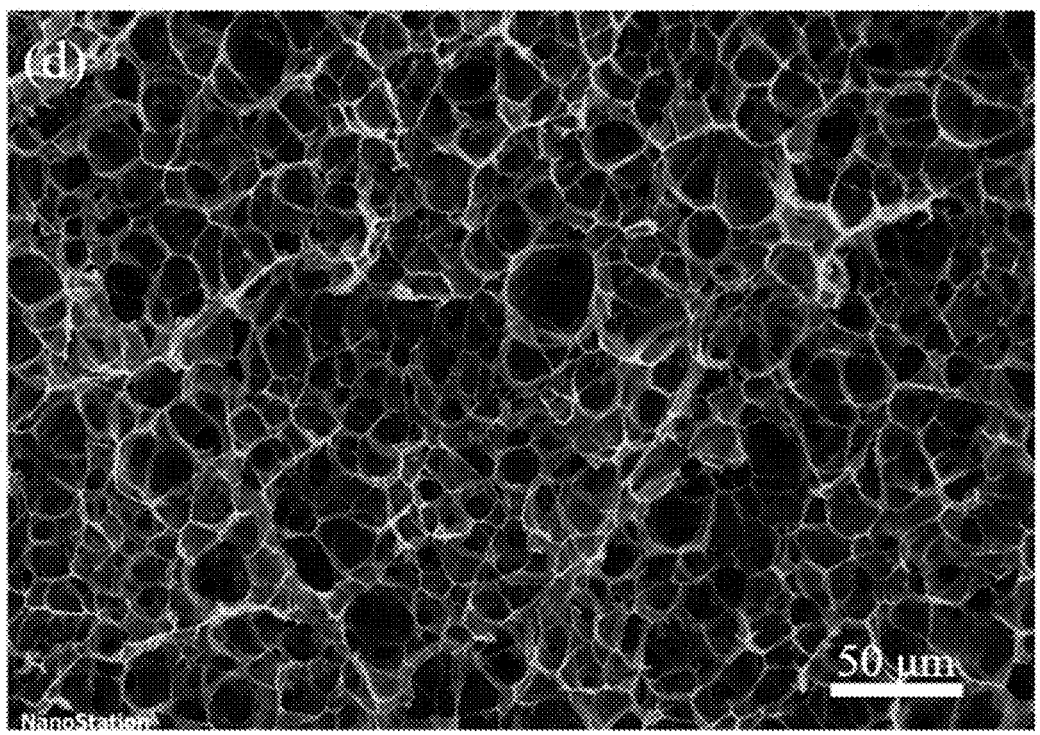
FIG. 3(d) shows the microstructure of the gel under gelatin concentrations of 8% (w/v) in Example 2 of the present invention under the SEM.

A test for mechanical properties of the bioink with different concentrations was carried out, and a printable range of the bioink is investigated from a view of elastic modulus. The test results are shown in FIG. 2, and it can be concluded that the elastic modulus of the gel is approximately linear with the concentration of the alginate when the concentration of the gelatin is unchanged. When the concentration of the alginate is 1% (w/v), the elastic modulus is 0.430±0.082 MPa; when the concentration of the alginate is increased to 4% (w/v), the elastic modulus of the gel increases to 1.137±0.087 MPa, which indicates that the elastic modulus of the constructed scaffold can be adjusted by adjusting the concentration of the alginate when constructing the 3D scaffold, so as to meet the mechanical requirements of the survival of different cells.

3. Observation of Hydrogel Morphology

Morphologies of the hydrogel material of the present invention after curing, freeze drying and gold spraying under a SEM are shown in FIGS. 3(a)-3(d). The gelatin plays an important role in the porosity of scaffold in the alginate/gelatin matrix materials system. After the scaffold is printed, the gelatin is gradually released from the scaffold to form certain porosity. Here, the bioink with concentrations of gelatin of 2% (w/v), 4% (w/v), 6% (w/v), and 8% (w/v) were prepared to observe the porosity of several different materials. When the concentration of gelatin was 2%, the microscopic morphology of the hydrogel showed a lamellar shape with no obvious micropores; when the concentration of gelatin was 4% (w/v), micropores appear in lamellas; when the concentration of gelatin reaches 6% (w/v), a large number of pores appear in the hydrogel, and with the increase of the concentration of gelatin, a larger micropore-structure appears in the material, and the distribution of the micropores is more uniform, which is beneficial to the proliferation and migration of cells, and also makes other nutrients easier to enter and exit the hydrogel during the cell culture process, thereby being beneficial to the metabolism of cells.

4. Analysis of Cell Activity

Figure 4A:
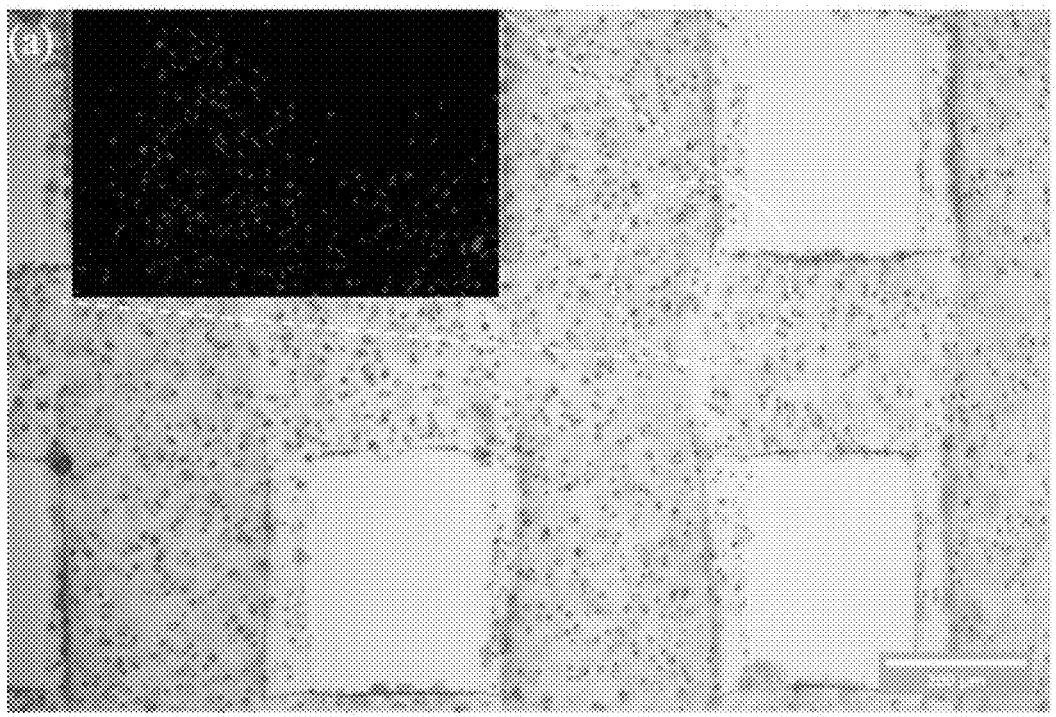
FIG. 4(a) shows a bright-field microscopic and immunofluorescence staining images on day 1 of a structure of a biological scaffold printed in Example 3 of the present invention.
Figure 4B:
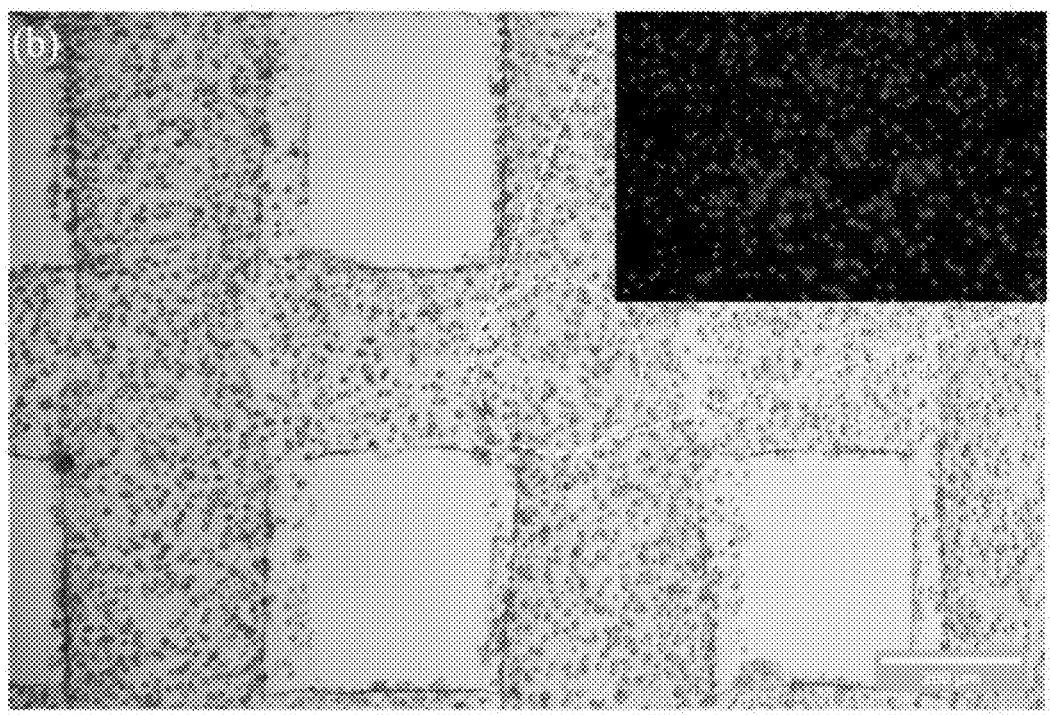
FIG. 4(b) shows a bright-field microscopic and immunofluorescence staining images on day 7 of a structure of a biological scaffold printed in Example 3 of the present invention.
Figure 5:
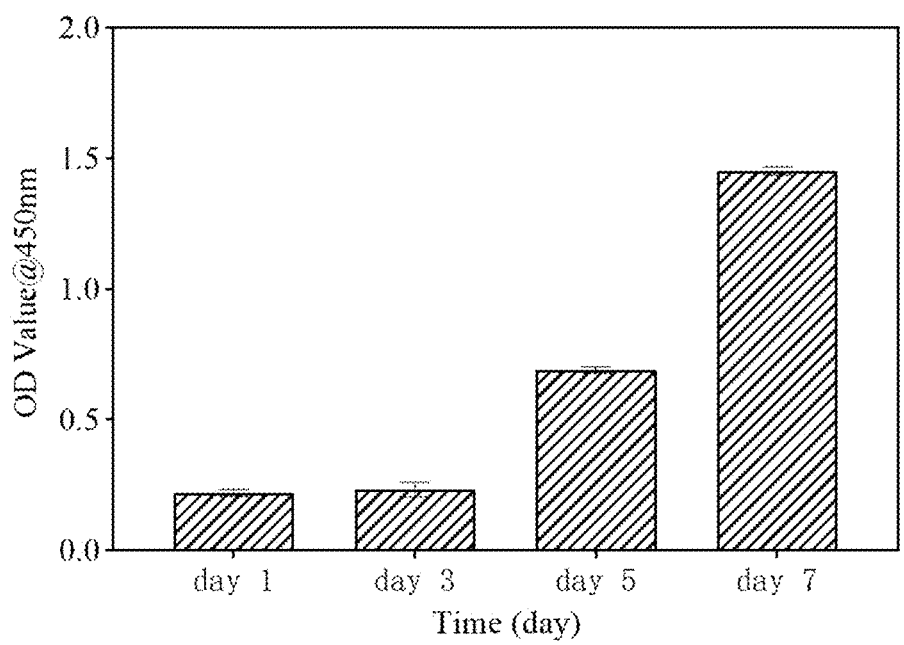
FIG. 5 shows a proliferation curve of cells in the printed structure in Example 3 of the present invention.

For evaluating the biocompatibility of the bioink, observing the activity and proliferation of the cells in the grid structure printed by using the bioink loaded with L929 cells. The cell viability was analyzed using a live/dead staining kit on the 1st, 3rd, 5th, and 7th day of culture respectively. The cells were observed by using an inverted fluorescence microscope, as shown in FIGS. 4(a) and 4(b), the live/dead cells was counted by using the ImageJ (image processing software). From the calculation, it can be obtained that a survival rate of cells was more than 96% after printing, which proved that the printing process had little effect on cells, and with the extension of culture time, the cells still maintained a high survival rate, and a large number of cell proliferation could be observed significantly.

The proliferation status of the cells was tested on the 1st, 3rd, 5th, and 7th day of culture using the CCK8 kit. Wherein, the tests on the first and third day after printing showed that the absorbance did not change much and the number of cells remained approximately the same, which mainly due to changes in the extracellular environment during printing; the tests on the fifth and seventh day showed a large increase in absorbance and a large proliferation of cells. It indicated that the printing process did not cause irreversible damage to the state of the cells and that the biomaterials used have good biocompatibility and can support cell proliferation and migration.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

Finally, it should be noted that, if there is no conflict, the examples of the present invention and various features in the examples can be combined with each other, and all are within the protection scope of the present invention. Additionally, all or a portion of the steps of the above-described methods may be performed in a computer system, such as a set of computer-executable instructions, and although the steps are listed in the order of 1, 2, 3, and so on, in some cases, the steps shown or described may be performed in an order other than that shown herein.

What is claimed is:

1. A hydrogel for cell-laden bioprinting comprising a polymer gel formed by adding a polypeptide cell-specific material into a matrix of alginate and gelatin and crosslinking and curing the matrix.

2. A method of utilizing the hydrogel for cell-laden bioprinting of claim 1 comprising applying the hydrogel for cell-laden bioprinting in the field of biomedicine.

3. A method for preparing a cell-laden bioink, comprising the steps of:
preparing a cell-laden bioink precursor via adding sodium alginate to phosphate buffered saline (PBS) and dissolving by stirring and warming thereby obtaining an alginate solution,
adding and dissolving gelatin and a polypeptide cell-specific material to the PBS thereby obtaining a gelatin composite solution,
mixing the alginate solution and the gelatin composite solution evenly thereby obtaining a bioink solution, and
centrifuging and adding a suspension of cells into the bioink solution and blowing the cells to make the cells disperse and even thereby obtaining the cell-laden bioink.

4. The method for preparing the cell-laden bioink according to claim 3, wherein a concentration range of the alginate solution is 2% to 5% (w/v) and a concentration range of the gelatin solution is 2% to 8% (w/v).

5. The method for preparing the cell-laden bioink according to claim 3, wherein the cells are L929 cells, the polypeptide cell-specific material is CMP27, the concentration of the alginate solution is 2.5% (w/v) and the concentration of the gelatin solution is 6% (w/v).

6. A method for preparing a cell-laden scaffold, comprising the steps of:
loading a cell-laden bioink prepared by the preparation method of claim 3 into a syringe of a 3D bio-printer,
extruding the cell-laden bioink onto a cryogenic platform through a pneumatic nozzle on the 3D bio-printer thereby preparing a grid-like cell-laden scaffold,
soaking the printed cell-laden scaffold in a 4.5% (w/v) calcium chloride solution for 5 minutes, and
washing with PBS thereby obtaining a final structure of the cell-laden scaffold.

7. A cell-laden scaffold prepared by the method for preparing the cell-laden scaffold of claim 6.

8. A method of utilizing the cell-laden scaffold of claim 7 comprising applying the cell-laden scaffold in the field of biomedicine.

9. An adhesive bandage, comprising the cell-laden scaffold of claim 7.

10. A method for preparing tissues and organs utilizing a freeform reversible embedding of suspended hydrogels (FRESH) extrusion printing, comprising the steps of:
fixing a gelatin support bath on a cryogenic platform,
loading a cell-laden bioink prepared by the preparation method of claim 3 into a syringe of a 3D bio-printer,
extruding and printing the cell-laden bioink into the gelatin support bath through a pneumatic nozzle,
raising a temperature of the cryogenic platform after,
releasing the printed structure, and
washing the printed structure with PBS.

11. The method for preparing tissues and organs utilizing the FRESH extrusion printing according to claim 10, further comprising the steps of:
incubating a prepared solution containing 5% (w/v) gelatin and 1% (w/v) $CaCl_2$ at 4° C. for 24 hours,
crushing the incubated solution utilizing a crusher after adding 3 times the volume of the $CaCl_2$ solution thereby obtaining gelatin granules;
centrifuging the gelatin granules,
removing the supernatant,
washing 3 times with the 1% (w/v) $CaCl_2$ solution,
centrifuging the gelatin granules again thereby obtaining a gelatin slurry, and transferring the gelatin slurry to a petri dish.

12. A method for preparing a cell-laden scaffold, comprising the steps of:
loading the cell-laden bioink prepared by the preparation method of claim 4 into a into a syringe of a 3D bio-printer,
extruding the cell-laden bioink onto a cryogenic platform through a pneumatic nozzle on the 3D bio-printer thereby preparing a grid-like cell-laden scaffold,
soaking the printed cell-laden scaffold in a 4.5% (w/v) calcium chloride solution for 5 minutes, and
washing with PBS thereby obtaining a final structure of the cell-laden scaffold.

13. A cell-laden scaffold comprising the cell-laden scaffold prepared by the preparation method of claim 12.

14. An adhesive bandage, comprising the cell-laden scaffold of claim 13.

15. A method of utilizing the cell-laden scaffold of claim 13 comprising applying the cell-laden scaffold in the field of biomedicine.

16. A method for preparing a cell-laden scaffold, comprising the steps of:
loading the cell-laden bioink prepared by the preparation method of claim 5 into a into a syringe of a 3D bio-printer,
extruding the cell-laden bioink onto a cryogenic platform through a pneumatic nozzle on the 3D bio-printer thereby preparing a grid-like cell-laden scaffold,
soaking the printed cell-laden scaffold in a 4.5% (w/v) calcium chloride solution for 5 minutes, and
washing with PBS thereby obtaining a final structure of the cell-laden scaffold.

17. A cell-laden scaffold comprising the cell-laden scaffold prepared by the preparation method of claim 16.

18. An adhesive bandage, comprising the cell-laden scaffold of claim 17.

19. A method of utilizing the cell-laden scaffold of claim 17 comprising applying the cell-laden scaffold in the field of biomedicine.

* * * * *